Dec. 8, 1942. M. W. BARNES ET AL 2,304,138
CONTROL OF SIMULTANEOUS ENDOTHERMIC AND EXOTHERMIC REACTIONS
Filed Oct. 18, 1939
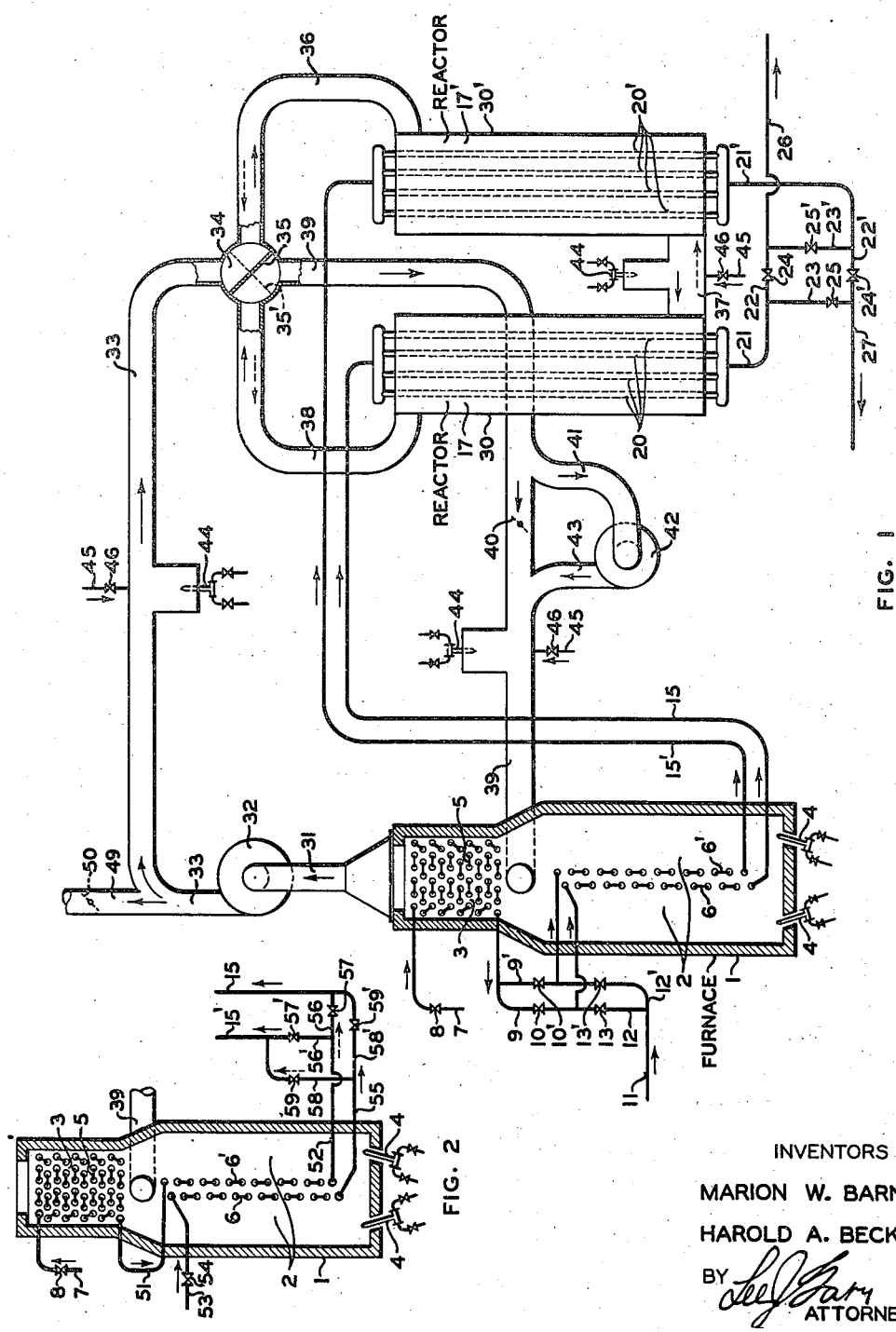
INVENTORS
MARION W. BARNES
HAROLD A. BECKER
BY
ATTORNEY Patented Dec. 8, 1942

2,304,138

UNITED STATES PATENT OFFICE 2,304,138

CONTROL OF SIMULTANEOUS ENDOTHERMIC AND EXOTHERMIC REACTIONS

Marion W. Barnes and Harold A. Becker, Chicago, Ill., assignors to Universal Oil Products Company, Chicago, Ill., a corporation of Delaware Application October 18, 1939, Serial No. 299,942

6 Claims. (Cl. 196—52)

The invention is directed more specifically to an improved method and means of controlling temperatures in simultaneously conducted endothermic and exothermic reactions in a system of the type in which heat evolved by the exothermic reaction is transferred to the endothermic reaction by a convective medium which is continuously circulated in indirect heat transfer relation with the reactants in the endothermic and exothermic steps.

The features of the invention may be advantageously employed for obtaining temperature control in a wide variety of processes, good examples of which are the various catalytically promoted processes for converting hydrocarbons in which the conversion reaction is endothermic and wherein the exothermic phase of the process involves periodic reactivation of the catalyst by burning therefrom, in a stream of oxygen-containing gases, heavy carbonaceous materials deposited on the catalyst during the preceding conversion period in the same reaction zone. More concrete examples of such processes are catalytic cracking, dehydrogenation, aromatization, cyclization and the like.

The necessity of frequent reactivation of the catalyst in such processes, the necessity of close temperature control in both the endothermic and exothermic reactions and the advantages of accomplishing this control by circulating a convective medium in indirect heat transfer relation with the reactants is now well understood by those familiar with the art and therefore requires no explanation. It is common practice in processes of this general nature to employ two or more reactors of the heat exchanger type and to alternate the zones of endothermic and exothermic reaction between these reactors by periodically discontinuing the flow of the stream of reactants to be converted through the reactor wherein their catalytic conversion has been taking place and supplying said stream to a reactor in which the catalyst has been freshly reactivated and to periodically discontinue the flow of the stream of reactivating gases through the reactor in which reactivation has been taking place and supply said reactivating gas stream to a reactor in which the conversion reaction has progressed to a point where reactivation of the catalyst is required and from which the stream of reactants to be catalytically converted has been diverted.

The present invention follows the aforementioned conventional practice and further provides for circulating a convective medium about the reactor in which reactivation is taking place in indirect heat transfer relation with the catalyst and reactivating gases, the convective medium thus serving as a cooling fluid in this reactor and its temperature being materially increased by heat evolved in the exothermic reaction, adjusting the temperature of the convective medium discharged from this reactor to the desired value and passing it about the reactor wherein the endothermic reaction is taking place in indirect heat transfer relation with the catalyst and the reactants in this reactor, whereby it serves as a heating medium and is materially cooled by the abstraction of heat supplied therefrom to the endothermic reaction, thereafter adjusting the temperature of the convective medium discharged from the second named reactor to the desired value and returning said convective medium in regulated quantities to the first mentioned reactor.

In the present instance, the convective medium employed comprises combustion gases which are circulated in the manner described by means of one or more suitable fans or blowers and, as a feature of the invention, a portion of these combustion gases is derived from a heater in which the stream of hydrocarbon reactants to be converted and the stream of reactivating gases are separately preheated prior to their introduction into the reactors wherein they contact the catalyst. The remainder of the convective medium comprises combustion gases separately generated within the system at one or a plurality of suitable intermediate points in the cycle or supplied thereto from an external source.

The arrangement and method of operation herein provided is such that a constant volume of combustion gases is circulated, the excess being removed from the coolest point in the cycle, thereby minimizing heat loss. Switching of the flow of combustion gases (the convective medium), when the zones of endothermic and exothermic reaction are shifted from one reactor to the other, is accomplished by a single switching valve or damper, and the propulsion means employed for circulating the convective medium operates continuously at a substantially constant speed and in only one direction. Also, the arrangement and method of operation herein provided obviates intermittent generation of combustion gases, the burner or burners which supply the combustible fuel-air mixture to the zone or zones in which the combustion gases utilized as said convective medium are generated being operated continuously under substantially uniform conditions. The system also possesses a high degree of flexibility and will permit variations in temperatures, rates of flow, etc. within relatively wide limits to suit requirements.

The features of the invention are applicable to a wide variety of different conversion processes of the type in which endothermic and exothermic reactions are simultaneously conducted. It is, therefore, not intended to limit the invention to any specific process of this general nature. However, for the sake of illustration, the succeeding description will deal with a specific process for the catalytic dehydrogenation of butanes to produce high yields of butenes therefrom, dehydrogenation of the butanes being the endothermic reaction, while the exothermic reaction comprises reactivation of the catalyst in situ by removing therefrom heavy carbonaceous materials deposited thereon during the endothermic reaction, said removal being accomplished by passing a stream of hot oxygen-containing gases through the catalyst bed.

In the accompanying diagrammatic drawing, Figure 1 illustrates one form of apparatus embodying the features of the invention and in which various catalytic conversion processes of the general character above mentioned may be conducted in accordance with the provisions of the invention. Figure 2 illustrates a modification of a portion of the apparatus shown in Figure 1.

Referring to both figures of the drawing, a furnace 1 having a combustion and heating zone 2 and lower temperature or fluid heating zone 3 in direct communication with zone 2 is supplied with combustible fuel and air by burners 4 which introduce the combustible mixture into the lower portion of zone 2. A suitable fluid conduit or heating coil 5 is provided in zone 3 and separate fluid conduits or heating coils 6 and 6' are provided in zone 2.

Referring now to Figure 1, the charging stock to be converted, which in this particular instance comprises butanes or a mixture of hydrocarbon gases consisting predominantly of butanes, is supplied to the inlet side of coil 5 through line 7 and valve 8 by any suitable well known means, not illustrated, and coil 5 communicates on its discharge side through lines 9 and 9', controlled respectively by valves 10 and 10', with coils 6 and 6', respectively, by means of which branch lines and control valves the mildly heated stream of reactants from coil 5 may be supplied selectively to and through either coil 6 or coil 6'.

The stream of reactivating gas, which in this instance may be combustion gases or other relatively inert gases containing a controlled minor amount of free oxygen, is supplied to the system from any suitable source, not illustrated, through line 11 and through branch lines 12 and 12' controlled respectively by valves 13 and 13', selectively to and through either coil 6 or coil 6'.

From the above it will be apparent that the charging stock gases may be continuously supplied through coil 5 and thence through either coil 6 or coil 6' and by control of valves 10 and 10' periodically switched from coil 6 to coil 6' and vice versa, while the stream of reactivating gases is also periodically switched by means of valves 13 and 13' with respect to coils 6 and 6', the charging stock passing through one of the latter coils and the reactivating gases passing through the other. Thus, both streams are continuously heated to the desired temperature in coils 6 and 6' and the combustion gases from zone 2, which have given up a substantial portion of their heat to the streams passing through coils 6 and 6', are supplied from the upper portion of this zone to zone 3, therein commingled, as will be later described, with other combustion gases and the commingled combustion gases in zone 3 are utilized to supply heat to the charging stock passing through coil 5 prior to its introduction into coil 6 or 6', as the case may be. Due to preheating of the charging stock in coil 5 to the desired temperature, which is regulated by the quantity and temperature of combustion gases commingled in zone 3 with the combustion gases from zone 2, the temperature of the stream of charging stock gases and reactivating gases issuing from coil 6 and 6' may be independently controlled to suit requirements regardless of which of the coils 6 or 6' is utilized to heat either stream and without varying the firing conditions in zone 2 when the coils are switched.

The stream of hot gases discharged from coil 6, which are hot charging stock gases during a portion of the operating cycle and hot reactivating gases during another portion of the operating cycle, is directed through line 15 to reactor 17. Similarly the stream of hot gases discharged from coil 6' is charging stock gases during a portion of the operating cycle and hot reactivating gases during another portion of the operating cycle and is supplied to reactor 17' through line 15'. Hot charging stock gases are supplied to reactor 17 during the time the hot reactivating gases are supplied to reactor 17', and vice versa, so that processing and regeneration take place simultaneously in the two reactors, the latter being periodically alternated with respect to processing and reactivation so that both the endothermic and exothermic reactions are continuous.

Reactors 17 and 17' are substantially identical in size and construction and may be any desired form of reactors of the heat exchanger type. It is, of course, within the scope of the invention, although only two reactors are here illustrated, to employ a plurality of reactors in each stream arranged for either parallel or series flow of reactants and reactivating gases therethrough. In the particular case here illustrated, the reactors each comprise a plurality of elongated tubular elements connected in parallel and each of the tubular elements 20 and 20' contains a bed of catalytic material which, in active state, is capable of promoting the conversion reaction and which is reactivated periodically by burning heavy deposited carbonaceous materials therefrom in a stream of hot oxygen-containing gases. The reaction products are discharged from reactor 17 through line 21 and from reactor 17' through line 21'. Line 21 terminates in branch lines 22 and 23 provided, respectively, with control valves 24 and 25 and communicating with the respective lines 26 and 27. Line 21' terminates in branch lines 22' and 23' provided respectively with control valves 24' and 25' and communicating with lines 27 and 26, respectively. By means of these branch lines and control valves, hydrocarbon conversion products discharged from the reactor in which the endothermic reaction is taking place may be supplied through line 26 to suitable separating and recovery equipment, not illustrated, while spent reactivating gases and combustion products resulting from burning of the carbonaceous materials from the catalyst are directed from the reactor in which reactivation is taking place through line 27 from the system or to suitable scrubbing or recirculating equipment, not illustrated, by means of which they may be returned, together with regulated amounts of added air or oxygen, through line 11 selectively to coil 6 or to coil 6'.

Each of the reactors 17 and 17' is disposed in a suitable insulated shell, housing or jacket 30 and 30', respectively, through which jackets convective medium such as combustion gases is circulated under conditions regulated to control the temperature of the endothermic and exothermic reactions.

The convective medium employed in this case comprises combustion gases from zone 3 of heater 1 and these relatively cool gases are directed through duct 31 to a suitable fan or blower 32 wherefrom they are discharged through duct 33 and supplied, in part, therethrough to a suitable stream-directing or switching mechanism 34 which, in this particular instance, comprises a reversible damper, the setting of which determines the path of flow of the gases.

With the damper in the position indicated at 35, the reactivating gases pass through duct 33, through member 34 and thence through duct 36 to the interior of the shell or housing 30' through which they pass about tubular elements 20' in indirect heat transfer relation with the catalyst disposed therein and the reactivating gases and products of combustion passing therethrough, this reactor being utilized at this time for conducting the exothermic reaction. The gases passing through the jacket around the tubular elements serve as a cooling medium and their temperature is substantially increased by heat evolved in the exothermic reaction. They are directed from the lower end of jacket 30' through duct 37 to the interior of jacket 30 wherein they pass about the tubular elements 20 of reactor 17, in indirect heat transfer relation with the catalyst disposed therein, and the reactants and conversion products pass therethrough while the combustion gases supply heat to the endothermic reaction which takes place in this zone. The temperature of the gases is thereby decreased and they pass from jacket 30 through duct 38 to the stream-directing member 34 wherefrom they are supplied through duct 39 to heating zone 3, wherein they commingle with the combustion gases supplied thereto from zone 2 of the heater and wherefrom the commingled gases, after giving up a portion of their heat to the charging stock passing through coil 5, are recycled through the reactor jackets in the manner described.

With the damper of member 34 in the position indicated by the dotted line 35', the direction of flow of the gases through jackets 30 and 30' is reversed to that above described, the gases from duct 33 passing from member 34 through duct 38 to and through jacket 30 and thence through duct 37 to and through jacket 30' and thence through duct 36, member 34 and duct 39 back to zone 3. Thus, when the endothermic and exothermic reactions are switched from one reactor to another, the flow of the convective medium is reversed by changing the position of the damper or stream-directing member of switching mechanism 34 and the convective medium is utilized to cool the reactor in which the exothermic reaction is taking place and heat the reactor in which the endothermic reaction is taking place.

In case the friction encountered in the duct work, reactors and heating zone 3 is so great that separate propulsion means located at different points in the combustion gas circuit may be employed to advantage for effecting circulation of the gases therethrough, a separate fan or blower may be provided as indicated at 42. This fan or blower 42 communicates on both its suction and discharge sides with duct 39 through the respective ducts 41 and 43 on opposite sides of a suitable valve or damper 40 disposed in duct 39, this damper being in a closed position when fan or blower 42 is utilized. Preferably, however, since fan or blower 42, when utilized, will be required to handle hotter gases than fan or blower 32, only the latter is employed, except in cases such as above mentioned, where the pressure drop encountered through the system cannot be satisfactorily overcome with one or more fans or blowers in the cooler portion of the system.

The invention provides for adjusting the temperature of the convective medium at several points in its circuit from zone 3 through the reactor jackets back to zone 3, to satisfy the requirements of the particular operation being conducted. To acomplish this, fresh increments of hot combustion gases may be added to the circulating stream thereof in any or all of the ducts 33, 37 and 39. These additional hot combustion gases may be generated in one or a plurality of zones external to and communicating with the ducts or, as in the case here illustrated, burners 44 may be provided for supplying combustible mixtures of fuel and air to ducts 33, 37 and 39 in regulated amounts to form additional hot combustion gases directly in the circulating stream of combustion gases and thereby increase the temperature of the latter to the desired degree. In case it is desired to partially cool the stream of circulating combustion gases in any or all of the ducts 33, 37 and 39, relatively cool gases such as air may be added in regulated amounts to the flowing stream, lines 45 controlled by valves 46 being provided in the case here illustrated for the introduction of air into any or all of the ducts 33, 37 and 39. Thus, regulated amounts of heating or cooling of the convective medium, as required, may be accomplished prior to its introduction into the jackets surrounding the zone of exothermic reaction, subsequent to its passage through this jacket and prior to its introduction into the jacket surrounding the zone of endothermic reaction and subsequent to its passage through the latter jacket but prior to its introduction into the low temperature heating zone 3.

To keep the quantity of circulating gases utilized as a convective medium substantially constant (so that with uniform firing in zone 2 of the heater and uniform firing of burners 44 and/or the introduction of air through lines 45 and valve 46 at a substantially uniform rate at each point of introduction, uniform conditions of temperature control will prevail throughout the entire operation, with the motivating means for the convective medium operated under conditions of substantially uniform load) the gases in excess of those required for good heat transfer conditions are removed from the cycle preferably at a point therein where the circulating gas stream is relatively cool. To accomplish this, a discharge duct or stack 49 provided with a suitable flow-regulating device such as damper 50 is provided to communicate with duct 33 between the fan or blower 32 and the burner 44 which communicates with this duct, whereby the excess gases are discharged from the cycle at substantially their coolest point.

Figure 2 illustrates a somewhat modified flow for the reactants passing through the heating coils of furnace 1 to the reactors. This flow may be employed as an alternative to that illustrated in Figure 1 but, as will be later explained, is not the full equivalent thereof.

When the flow shown in Figure 2 is employed the stream of hydrocarbon reactants to be converted is supplied to coil 5 through line 7 and valve 8, as in Figure 1, and passes from coil 5 through line 51 to coil 6' wherefrom it is discharged through line 52. The reactivating gas stream is supplied to coil 6 through line 53 and valve 54, which replace lines 11, 12, 12' and valves 13 and 13' of Figure 1, and the heated reactivating gases are discharged from coil 6 through line 55. Discharge line 52 from coil 6' communicates with lines 15 and 15', respectively, through branch lines 56 and 56' having the respective valve 57 and 57'. Discharge line 55 from coil 6 communicates with the respective lines 15' and 15 through branch lines 58 and 58' having the respective valves 59 and 59'.

With the arrangement shown in Figure 2, while reactor 17 is employed as the zone of endothermic reaction and reactor 17' is employed as a zone of exothermic reaction, valves 57 and 59 are open and valves 57' and 59' are closed whereby the heated hydrocarbon reactants flow from coil 6' through lines 52, 56, valve 57 and line 15 to reactor 17, while the heated reactivating gases flow from coil 6 through lines 55, 58, valve 59 and line 15' to reactor 17'. While reactor 17' is employed as the zone of endothermic reaction and reactor 17 is employed as the zone of exothermic reaction, valves 57 and 59 are closed and valves 57' and 59' are open whereby the heated hydrocarbon reactants flow from coil 6' through lines 52, 56', valve 57' and line 15' to reactor 17', while the heated reactivating gases flow from coil 6 through line 55, line 58', valve 59' and line 15 to reactor 17.

It will be apparent from the above description of Figure 2 that, with the type of furnace and the flow here illustrated, different firing conditions may, when desired, be employed on opposite sides of coils 6 and 6' to obtain different heating conditions in these two zones, since coil 6' is continuously employed in conjunction with coil 5 to heat the stream of hydrocarbon reactants and coil 6 is continuously employed to heat the stream of reactivating gases. However, with the arrangement shown in Figure 2, the switching valves 57, 57', 59 and 59' must operate at considerably higher temperatures than the switching valves 10, 10', 13 and 13' of Figure 1 and for this reason the arrangement shown in Figure 1 is preferred in most instances to that shown in Figure 2.

As an example of one specific operation of the process, when employing an apparatus such as illustrated in Figure 1 as a butane dehydrogenating system, the charging stock which consists essentially of iso and normal butanes is supplied to coil 5 at a temperature of approximately 85° F. and at the rate of approximately 14,470 pounds per hour. It is heated in coil 5 to an outlet temperature of approximately 870° F.

When reactor 17 is employed as the zone of endothermic reaction and reactor 17' is employed as the zone of exothermic reaction, the preheated charging stock gases from coil 5 are directed through coil 6 and line 15 to and through reactor 17, which they enter at a temperature of approximately 1075° F., while the reactivating gas stream which comprises combustion gases containing a controlled minor amount of air is supplied to coil 6' at a temperature of approximately 200° F. and at the rate of approximately 14,950 pounds per hour, heated therein to an outlet temperature of approximately 900° F. and supplied at substantially this temperature through line 15' to and through reactor 17'.

When reactor 17' is employed as the zone of endothermic reaction and reactor 17 is employed as the zone of exothermic reaction, the preheated charging stock gases are supplied from coil 5 to and through heating coil 6' and thence through line 15' to and through reactor 17' which they enter at a temperature of approximately 1075° F., while the reactivated gas stream is supplied to and through heating coil 6 and directed therefrom at a temperature of approximately 900° F. through line 15 to and through reactor 17.

Substantially uniform firing conditions are maintained on opposite sides of the tube bank comprising the coils 6 and 6' and the combustion gases which have given up a large portion of their heat to the fluids passing through these coils leave zone 2 at a temperature of approximately 1825° F., at the rate of approximately 7700 pounds per hour, and commingle in zone 3 with approximately 37,000 pounds per hour of combustion gases from duct 39, the latter being supplied to zone 3 at a temperature of approximately 1200° F. The commingled gases are cooled in zone 3 by the abstraction therefrom of heat supplied to the charging stock gases and are directed from this zone to blower 32 at a temperature of approximately 600° F., the total quantity of gases handled by blower 32 being approximately 44,700 pounds per hour. This quantity is reduced to approximately 23,350 pounds per hour by ejecting gases from duct 33 through discharge duct or stack 49 at the rate of approximately 21,350 pounds per hour.

Burner 44, communicating with duct 33, supplies a combustible mixture of fuel and air thereto at a rate and in the proportions regulated to increase the temperature of the resulting commingled combustion gases to approximately 950° F. and to bring the total quantity of these gases to approximately 30,350 pounds per hour. They are introduced through the switching mechanism and communicating duct into the jacket surrounding the reactor wherein the exothermic reaction is taking place and in passing therethrough are heated to a temperature of approximately 980° F., the temperature of the spent reactivating gases leaving this reactor being approximately 1150° F.

In passing therefrom to the reactor wherein the endothermic reaction is taking place, the temperature of the circulating combustion gas stream is increased to approximately 1550° F. by introducing suitable quantities of combustible fuel and air through burner 44 to duct 37 and the total quantity of hot combustion gases entering the jacket surrounding the endothermic reaction zone is approximately 37,000 pounds per hour. They give up sufficient heat to the endothermic reaction to reduce their temperature to approximately 1200° F., the temperature of the conversion products leaving the endothermic reactor being approximately 1125° F.

The combustion gases leaving the jacket surrounding the zone of endothermic reaction are supplied through the switching mechanism to duct 39 and are supplied therefrom to zone 3 to complete the cycle.

It will be apparent from the above that with this operation a substantially uniform temperature within the range of 1075 to 1125° F. is maintained in the endothermic reaction zone and a substantially uniform temperature within the range of 900 to 1150° F. is maintained in the exothermic reaction zone regardless of which reactor is utilized for the endothermic or the exothermic reaction and regardless of which of the coils 6 and 6' is employed for heating the stream of charging stock gases and for heating the reactivating gas stream. These temperature ranges are suitable, respectively, for effecting catalytic dehydrogenation of the butanes with the type of catalyst employed and for reactivating the catalyst in the manner described without damage thereto. With a different catalyst, different charging stock and/or different type of conversion reaction, the temperatures and quantities given may be varied to suit requirements and maintain the desired temperature in the exothermic reaction zone and substantially the same or any other desired temperature in the endothermic reaction zone and in some instances it will be found desirable to cool rather than to heat the convective medium at some or all of the various points provided.

We claim:

1. In a process involving endothermic and exothermic conversion reactions simultaneously conducted in separate reactors, each of which is alternately employed as the zone of said endothermic reaction and as the zone of said exothermic reaction, the method of controlling the reaction temperatures in the reactors which comprises establishing a cyclic flow of convective gases in series through the reactors in indirect heat transfer relation with the reactants undergoing conversion therein, alternating the sequence of said flow through the reactors as the zones of endothermic and exothermic reaction are alternated so that said convective gases pass first through the reactor in which the exothermic reaction is taking place, thence through the reactor in which the endothermic reaction is taking place and back to the reactor in which the exothermic reaction is taking place, altering the temperature of the convective gases of the cycle by heating and cooling at selected points therein exterior to the reactors, accomplishing at least a portion of said cooling by passing the convective gases of the cycle, in that portion of the latter through which they flow from the endothermic to the exothermic reactor, in indirect heat transfer relation with cooler reactants being supplied to at least one of said reactors, accomplishing at least a portion of said heating by continuously adding fresh increments of hotter gases to the cycle and continuously removing relatively cool gases from the cycle in quantities regulated to keep the total quantity of gases in the cycle substantially constant.

2. In a process involving endothermic and exothermic reactions simultaneously conducted in separate reactors, the method of controlling the temperatures of said reactions which comprises generating hot combustion gases and transferring heat therefrom to the separate streams of reactants being supplied to said separate reactors, supplying resulting combustion gases in series through said reactors first in indirect heat exchange relation with the reactants undergoing said exothermic conversion in one reactor, thence in indirect heat exchange relation with the reactants undergoing said endothermic conversion in the other reactor and thence back through at least a portion of the zone wherein said first mentioned heat exchange is accomplished, to effect a continuous cyclic flow of said gases, adjusting the temperature of the combustion gases to suit requirements at a plurality of selected points in the cycle exterior to the reactors and removing relatively cool combustion gases from the cycle at a rate regulated to maintain the total quantity of combustion gases in the cycle substantially constant.

3. In a process involving an endothermic and an exothermic reaction simultaneously conducted in separate reaction zones, the improved method of obtaining temperature control in said reaction zones by circulating a convective medium about said zones in indirect heat transfer relation with the reactants undergoing treatment therein, which comprises generating combustion gases in a combustion zone, extracting heat therefrom and utilizing the same to preheat said reactants prior to their introduction into said reaction zones, adjusting the temperature of the resulting partially cooled combustion gases to the desired degree and passing the same about the reaction zone wherein said exothermic reaction is taking place, whereby to supply evolved heat from said exothermic reaction to the combustion gases and control the temperature of said exothermic reaction, thereafter readjusting the temperature of said combustion gases to the desired degree and passing the same about the reactor in which said endothermic reaction is taking place, whereby to supply heat from the gases to the endothermic reaction and control the temperature of the latter, commingling combustion gases discharged from about the last mentioned reactor with said combustion gases which have given up a portion of their heat in said preheating of the reactants and thereby establishing a cyclic flow of said commingled combustion gases about said reactors in the manner hereinbefore described, and removing from the cycle, at a point therein intermediate the point at which said commingling of the combustion gases occurs and the reactor wherein said exothermic reaction is taking place, a quantity of combustion gases regulated to maintain the total quantity of gases in the cycle substantially constant.

4. In a process involving an endothermic and an exothermic reaction simultaneously conducted in separate reaction zones, the improved method of obtaining temperature control in said reaction zones by circulating a convective medium about said zones in indirect heat transfer relation with the reactants undergoing treatment therein, which comprises supplying relatively cool combustion gases derived as hereinafter described to the reactor wherein the exothermic reaction is taking place, passing the same about said reactor in indirect heat transfer relation with the reactants undergoing treatment therein, thereby supplying heat evolved in the exothermic reaction to said combustion gases and controlling the temperature of the exothermic reaction, further increasing the temperature of the resulting hot combustion gases to the desired degree by commingling therewith regulated quantities of hotter, freshly generated combustion gases, passing the resulting hot combustion gas mixture in indirect heat transfer relation with the reactants undergoing said endothermic treatment in the other reactor, whereby to supply heat to the latter from said combustion gases and control the endothermic reaction temperature, adding heat to the resulting partially cooled combustion gases by commingling therewith regulated amounts of hotter, freshly generated combustion gases, whereby to increase their temperature to the desired degree, generating additional quantities of hot combustion gases, passing the latter through a high temperature heating zone and therein supplying heat therefrom to the stream of reactants being supplied to the endothermic reactor and to a separate stream of the reactants being supplied to the exothermic reactor, commingling the resulting partially cooled combustion gases with the combustion gases discharged from the reactor in which said endothermic reaction is taking place, after the temperature of the latter has been increased as above described, and supplying heat from the commingled gases to one of said streams of reactants in a lower temperature heating zone prior to the passage of said stream to said higher temperature heating zone, discharging regulated quantities of the resulting commingled relatively cool combustion gases from the system, supplying additional heat to the remaining portion thereof by commingling therewith regulated quantities of freshly generated hotter combustion gases and thereafter supplying the resulting commingled gases as said first mentioned combustion gases to the reactor wherein said exothermic reaction is taking place.

5. An apparatus of the character described comprising, in combination, a furnace having a high temperature heating zone and a low temperature heating zone, separate fluid conduits in said high temperature heating zone, means for passing a stream of fluid selectively through either of said fluid conduits, another fluid conduit in said low temperature heating zone, means for passing a separate stream of fluid therethrough and thence selectively through either of said fluid conduits in the high temperature heating zone, means for generating hot combustion gases in said furnace and passing the same through said high temperature heating zone and therefrom to and through the low temperature heating zone whereby to supply heat to said streams of fluid passing through said fluid conduits, a reactor containing a bed of contact material and provided with a jacket for the passage of combustion gases thereabout, a separate reactor containing another bed of said contact material and provided with a jacket for the passage of combustion gases thereabout, a conduit connecting the outlet end of one of the first named fluid conduits with the inlet end of one of said reactors, a conduit connecting the outlet end of the other of said first named fluid conduits with the inlet end of the other reactor, a duct connecting said low temperature heating zone with the inlet side of propulsion means, such as a fan or blower, for combustion gases discharged from the low temperature heating zone, a duct leading from the outlet side of said propulsion means to a stream-directing mechanism, a stack communicating with the last named duct, separate ducts connecting said stream-directing mechanism with each of said jackets, another separate duct connecting said jackets and another separate duct leading from said stream-directing mechanism to the low temperature heating zone, said ducts, propulsion means and stream-directing mechanism being adapted to supply combustion gases from the lower temperature heating zone selectively to and through the jackets surrounding either of said reactors, thence to and through the jackets surrounding the other reactor back to said low temperature heating zone.

6. An apparatus of the character described comprising, in combination, a heater having a high temperature heating zone and a low temperature heating zone, means for generating hot combustion gases in said heater and passing the same through said high temperature heating zone and thence through said low temperature heating zone, fluid conduits disposed in said low temperature and high temperature heating zones to receive heat from said combustion gases, means for passing separate streams of reactants through said fluid conduits, separate reactors of heat exchanger type each adapted to contain a mass of granular contact material and each adapted for the flow of combustion gases therethrough in indirect heat exchange relation with the mass of contact material disposed therein, means for supplying either of said streams of reactants preheated in said fluid conduits selectively to and through the mass of contact material in either of said reactors, a duct leading from said low temperature heating zone and having propulsion means such as a fan or blower disposed therein, said duct communicating, on the discharge side of the propulsion means, with a stream-directing mechanism adapted to selectively direct combustion gases from said low temperature heating zone through either of said reactors in indirect heat exchange relation with the mass of contact material disposed therein and the reactants passing therethrough, a duct connecting the two reactors and adapted to transmit combustion gases from either reactor to the other, a duct leading from each reactor to a stream-directing mechanism adapted to selectively direct combustion gases discharged from either reactor to said low temperature heating zone, a flue communicating with the first named duct through which combustion gases may be discharged from the system, means being provided at selected points in said ducts for modifying the temperature of the circulating stream of combustion gases at said selected points.

MARION W. BARNES.
HAROLD A. BECKER.